United States Patent
Fonda-Bonardi

(12) 
(10) Patent No.: US 6,655,910 B2
(45) Date of Patent: Dec. 2, 2003

(54) TURBOCOMPRESSOR WITH SPECIALLY CONFIGURED THRUST WASHER

(76) Inventor: G. Fonda-Bonardi, 1450 23rd St., Santa Monica, CA (US) 90404-2902

(*) Notice: Subject to any disclaimer, the term of this patent is extended or adjusted under 35 U.S.C. 154(b) by 0 days.

(21) Appl. No.: 10/052,717

(22) Filed: Jan. 16, 2002

(65) Prior Publication Data

US 2003/0133785 A1 Jul. 17, 2003

(51) Int. Cl.$^7$ ................................................. F01D 3/00
(52) U.S. Cl. ........................ 415/106; 415/112; 415/229
(58) Field of Search ............................... 415/104, 105, 415/106, 109, 111, 112, 229; 417/365, 405, 406, 407

(56) References Cited

U.S. PATENT DOCUMENTS

| | | | | |
|---|---|---|---|---|
| 1,488,931 A | * | 4/1924 | Marechal | 415/106 |
| 2,811,109 A | * | 10/1957 | Brill et al. | 415/112 |
| 3,656,823 A | * | 4/1972 | Tiraspolsky et al. | 384/306 |
| 3,740,163 A | * | 6/1973 | Schinnerer et al. | 415/111 |
| 3,778,123 A | * | 12/1973 | Hendler et al. | 384/132 |
| 4,482,297 A | * | 11/1984 | Mosimann et al. | 416/218 |
| 4,808,070 A | | 2/1989 | Fonda-Bonardi | |
| 5,567,129 A | | 10/1996 | Bonardi | |
| 6,231,302 B1 | | 5/2001 | Bonardi | |

* cited by examiner

*Primary Examiner*—Ninh H. Nguyen
(74) *Attorney, Agent, or Firm*—James E. Brunton, Esq.

(57) ABSTRACT

A gas bearing system for use in a turbocompressor or similar device that embodies a uniquely configured thrust washer or disk that exhibits superior strength characteristics when the disk is rotated at high speed. The thrust washer is a generally circular-shaped disk, has a predetermined diameter and comprises a body portion having spaced apart faces and a generally "V" shaped groove formed intermediate the spaced-apart faces to define a pair of radially outwardly extending segments.

18 Claims, 4 Drawing Sheets

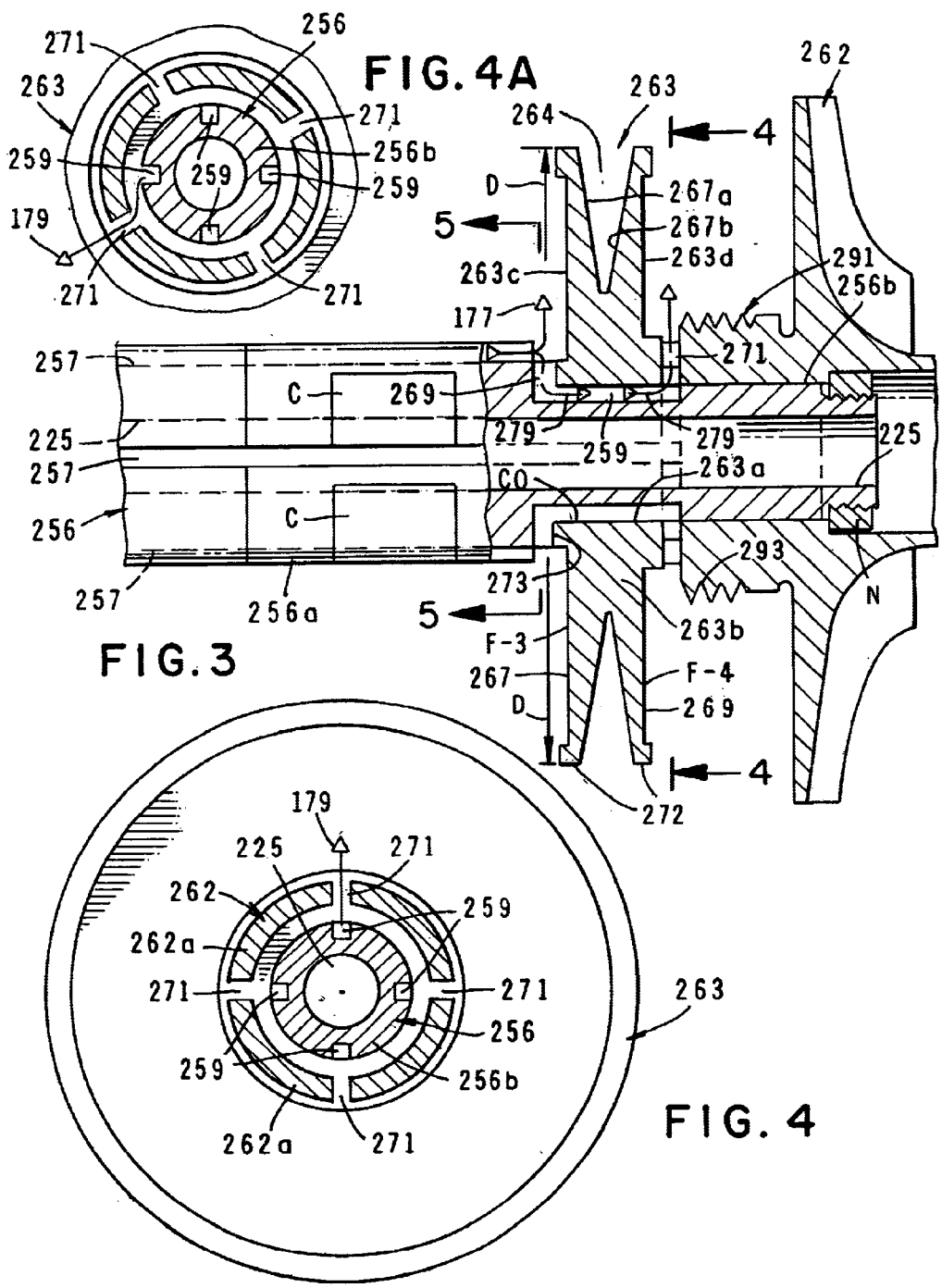

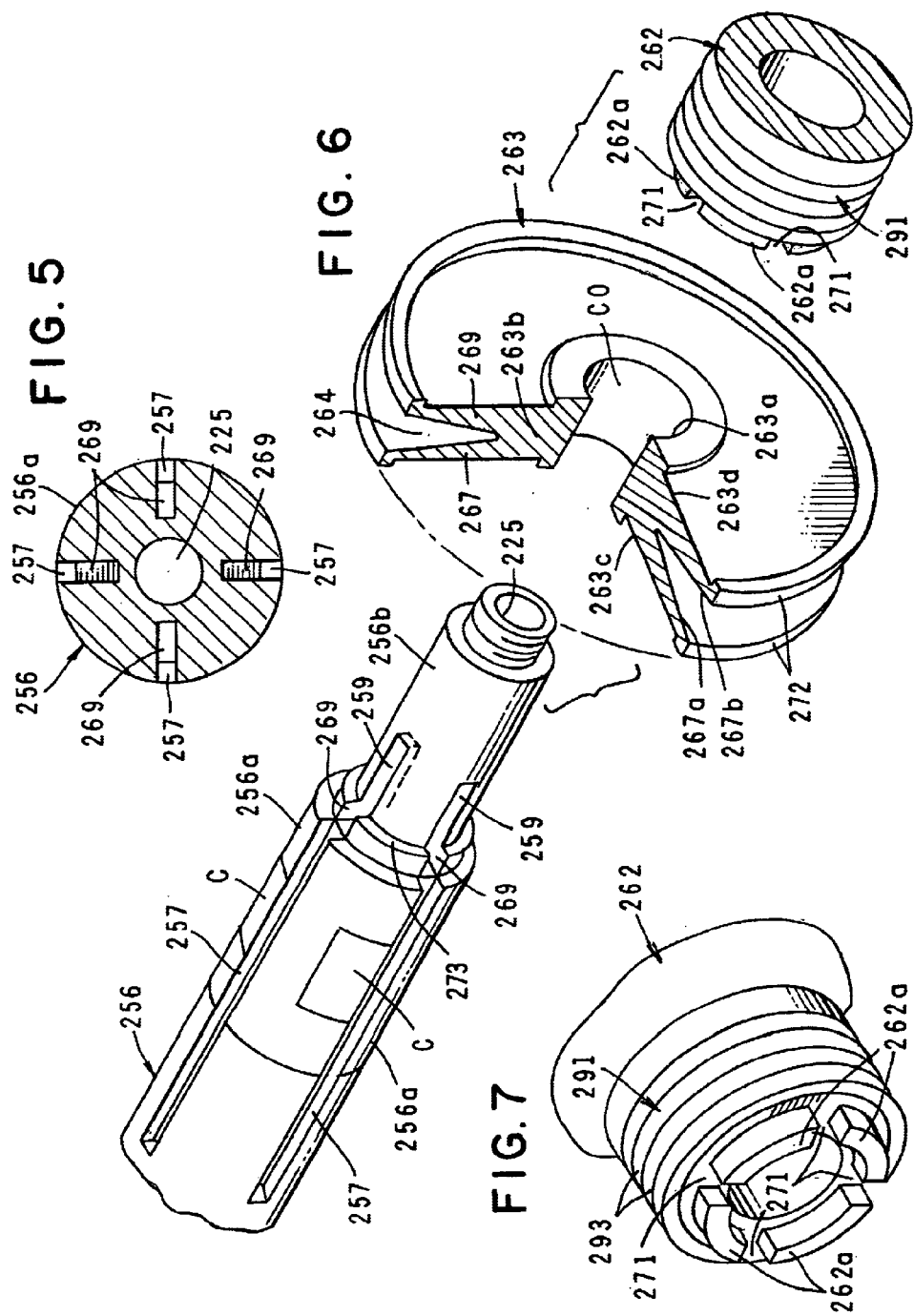

TURBOCOMPRESSOR WITH SPECIALLY CONFIGURED THRUST WASHER

BACKGROUND OF THE INVENTION

1. Field of the Invention

The present invention relates generally to gas bearing turbocompressors. More particularly, the invention concerns turbocompressors embodying a novel, uniquely configured thrust washer in which centrifugal stresses are significantly reduced.

2. Discussion of the Prior Art

Turbocompressors have been in use as turbochargers for internal combustion engines for many years. These types of turbocompressors have generally embodied oil-lubricated bearings. The trend in recent years in turbocompressor design has been towards higher compression ratios requiring higher revolutions per minute (RPM) of the spindle of the turbocompressor and resulting in higher exhaust temperatures. Under such conditions, oil lubrication of the bearings becomes inadequate and can possibly result in cavitation in the bearings as a result of the higher rubbing speed, and in thermal decomposition as a consequence of the higher temperatures. A solution to the aforementioned problems is provided by the use of gas bearings such as the bearings disclosed in U.S. Pat. No. 4,808,070 issued to the present inventor. The novel gas bearings disclosed in U.S. Pat. No. 4,808,070 can easily handle the required RPM and rubbing speeds of most types of modern turbo compressors.

Another application of oil free bearings is in the air feed of fuel cells which are poisoned by oil vapor.

In a typical turbocharger the compressor is fed through a filter that causes a significant pressure drop at the inlet to the compressor resulting in an inlet pressure lower than the atmosphere. On the other hand, the conventional turbine discharges to atmosphere through a muffler or catalytic converter also causing a pressure drop which results in a pressure higher than atmosphere at the exhaust of the turbine. The resulting pressure difference between the compressor housing and the turbine housing causes a net thrust to develop in the shaft connecting the compressor wheel and the turbine wheel. In an oil-lubricated turbocharger this thrust is absorbed by a traditional oil-lubricated thrust washer. However, in the case of gas bearings the thrust is typically compensated by the arrangement described in U.S. Pat. No. 5,567,129 issued to the present inventor. Because of the relevance of the U.S. Pat. Nos. 4,808,070 and 5,567,129 to a complete understanding of the present invention, both of these patents are hereby incorporated by reference as though fully set forth herein.

U.S. Pat. No. 6,231,302 entitled Thermal Control System for Gas Bearing turbocompressor, also issued to the present inventor is directed toward solving the problems caused by large temperature differences between the ends of the turbocompressor. This latter patent, U.S. Pat. No. 6,231,302, is also incorporated by reference as though fully set forth herein.

An important component of the turbocompressor disclosed in U.S. Pat. No. 6,231,302 is the thrust washer (therein described as "third wheel") which is there provided in the form of a thin disk that is mounted on a rotating shaft. The thrust washer of necessity is provided with a hole in the center that is needed for the physical assembly of the turbocompressor. It is, of course, fundamental that the central hole weakens the disk against stresses generated by centrifugal forces when the disk is spinning at high speed. Such stresses increase with the diameter of the disk as well as the square of the angular speed and may exceed the strength of the material resulting in the destruction of the disk if either diameter or angular speed exceed a limiting value. Since the angular speed is predetermined by gas dynamic requirements of the turbine and compressor wheels, the diameter is limited by the strength of the material. However, the diameter is desired to be as large as possible because the aerodynamic stiffness of the thrust bearing is proportional to the square of the diameter.

One objective of the present invention is the reduction of the centrifugal stresses in the apertured disk so as to allow an increase in the diameter of the disk and consequently an increase in the aerodynamic stiffness of the bearing. Another object of the invention is to accomplish the reduction of the centrifugal stresses while retaining the flatness and parallelism of the faces of the disk so as to maintain the gas dynamic performance of the thrust bearings. Still another object is to reduce the stresses at the center hole of the disk by removing existing stress concentrations resulting from auxiliary openings in the disk such as those found in the prior art.

It is well known that the stressing a spinning wheel or disk is largest at the edges of a central hole, and that this stress can be substantially decreased by tapering the axial thickness of the wheel from a maximum near the center to a minimum at the edge.

It is also well known that holes in a plate under stress double the tangential stress at the edge of the hole and thereby act as stress concentrators. Since the design of the high temperature thrust bearing requires communication of gas from one face to the other, the apertures 179 provided in the disk 162 as shown in FIG. 3 of U.S. Pat. No. 6,231,302 are such stress concentrators. In the manner to be described hereinafter, this stress can be reduced by transferring the openings from the disk to the rotating shaft.

SUMMARY OF THE INVENTION

It is an object of the present invention to provide an improved gas bearing system for use in a turbocompressor or similar device, such as that disclosed in incorporated by reference U.S. Pat. No. 6,231,302 which embodies a uniquely configured thrust washer or disk that exhibits superior strength characteristics when the disk is rotated at high speed. More particularly, it is an object of the invention to provide such a thrust washer in which the stresses found at the edges of the central hole in the disk are substantially decreased by tapering the axial thickness of the disk from a maximum near the center of the disk to a minimum proximate the edge of the disk.

Another object of the invention is to accomplish a reduction in the centrifugal stresses in the thrust washer so as to allow an increase in the diameter of the disk and consequently an increase in the aerodynamic stiffness of the bearing.

Another object of the invention is to accomplish a reduction in the centrifugal stresses while retaining the flatness and parallelism of the faces of the disk so as to retain the gas dynamic performance of the thrust bearings.

Another object of the invention is to provide a thrust washer as described in the preceding paragraphs which is generally circular shaped disk, has a predetermined diameter and comprises a body portion having spaced apart faces and a groove formed intermediate the spaced apart faces to define a pair of radially outwardly extending segments.

Another object of the invention is to provide a thrust washer as described in the preceding paragraph in which the groove formed intermediate the spaced apart faces has sloping sidewalls and has a depth generally greater than one-half the radius of the thrust washer.

These and other objects are realized by the turbocompressor described in the paragraphs that follow.

BRIEF DESCRIPTION OF THE DRAWINGS

FIG. 3 is a fragmentary, side-elevational, cross-sectional view showing in greater detail the novel thrust washer of the invention and the modified shaft upon which the disk is mounted.

FIG. 4 is a cross-sectional view taken along lines 4—4 of FIG. 3.

FIG. 4A is a cross-sectional view similar to FIG. 4 illustrating the flow path of the gases through an alternate construction of the apparatus.

FIG. 5 is a cross-sectional view taken along lines 5—5 of FIG. 3.

FIG. 6 is a generally perspective, exploded view of the thrust washer and shaft shown in FIG. 3.

FIG. 7 is a fragmentary, generally perspective rear view of the connector hub shown in FIG. 6.

DESCRIPTION OF THE INVENTION

Figure 1:
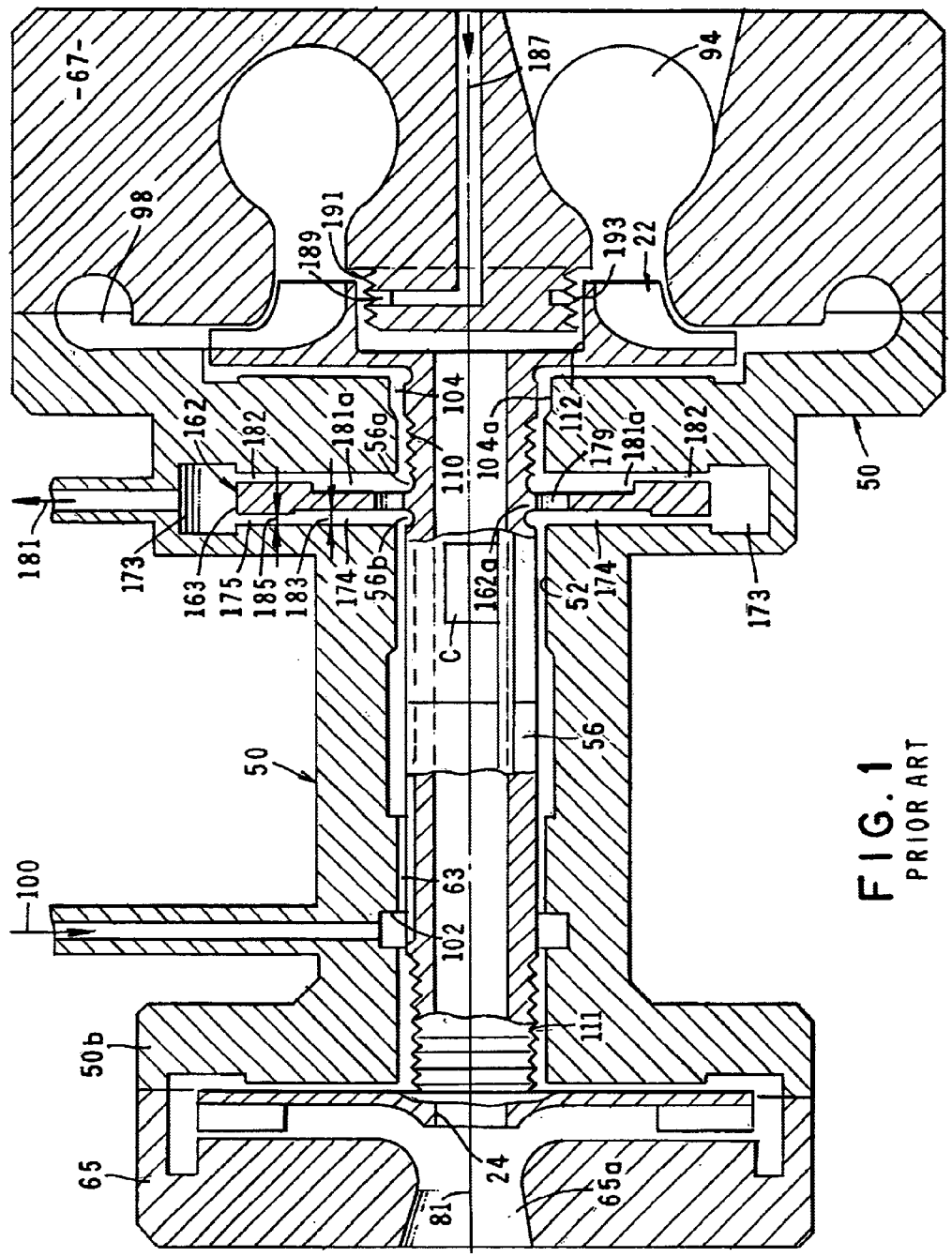
FIG. 1 is a diagrammatic, side elevation, cross-sectional view of a prior art, gas bearing turbocompressor apparatus of the character disclosed in U.S. Pat. No. 6,231,302.

Referring to the drawings and particularly to FIG. 1, a prior art turbocompressor of the character disclosed in incorporated by reference U.S. Pat. No. 6,231,302 is there shown. This turbocompressor is similar in many respects to the turbocompressor of the present invention and like numbers are used in the drawings of the turbocompressor of the present invention to identify like components.

As shown in FIG. 1 of the drawings, the apparatus of the present invention comprises a support 50 and an elongated, generally cylindrical shaft 56, which is rotatable within the bore of support 50, has first and second ends and an intermediate portion that is disposed between the first and second ends. Shaft 56, which is of a predetermined diameter less than the diameter of the bore also has a longitudinally extending bore there through, and includes an outer surface provided with a plurality of circumferentially spaced, longitudinally extending grooves 63 and a plurality of recessed areas C of predetermined depth;

A first closure member 65 is connected to support 50 to define a first chamber 65a. A first wheel 24 is disposed within first chamber 65a and is connected to the first end of shaft 56 for rotation therewith.

A second closure member 67 is also connected to support 50 to define a second chamber. A second wheel 22 is disposed within the second chamber and is connected to second end of shaft 56 for rotation therewith. A third wheel or disk ("Thrust washer") 162 having a central opening 162a is received over shaft 56 and is disposed within an intermediate chamber 163. As is discussed in the '302 patent, equalizing means are provided for substantially equalizing axial forces upon rotation of the shaft so that the shaft will remain substantially axially centered within the bore.

In operating the turbocompressor shown in FIG. 1 seal gas is admitted through a single gas inlet 100. The gas then flows through a circumferential groove 102 in the housing 50 and is delivered via longitudinal grooves 63 to a circumferential groove 56b formed in the shaft. Next the gas flows to gaps 174 and 175 of the third thrust bearing and finally out to a volume 173. The second thrust bearing receives seal gas through openings 179 formed in disk 162 in the proximity of shaft 56, forming a direct channel of communication between circumferential grooves 56a and 56b. From groove 56a the gas then proceeds through gaps 181a and 182 to collecting volume 173.

With the novel constructions described in the preceding paragraph, the apparatus can function in the same manner as described in the '302 patent without having to provide openings in the wheel such as openings 179.

As is also shown in FIG. 1, a third gas supply means or third gas inlet 187 is provided in or near the axis of support member 67. This third gas inlet is interconnected with a circumferential groove 189 located in the middle of labyrinth 191, and is provided with teeth 193 on either side.

Reference should be made to U.S. Pat. No. 6,231,302 for a more detailed explanation of the construction and operation of the turbo compressor illustrated in FIG. 1.

Turning next to FIGS. 2 through 8 one form of the improved turbo compressor of the present invention is there illustrated. This turbo compressor is similar in many respects to that shown in FIG. 1 and like numerals are used in Figures 2 through 8 to identify like components. As previously mentioned, the primary differences between the turbo compressor of this invention and that shown in FIG. 1 include a differently constructed shaft and the provision of an intermediately located thrust washer of unique construction.

Figure 2:
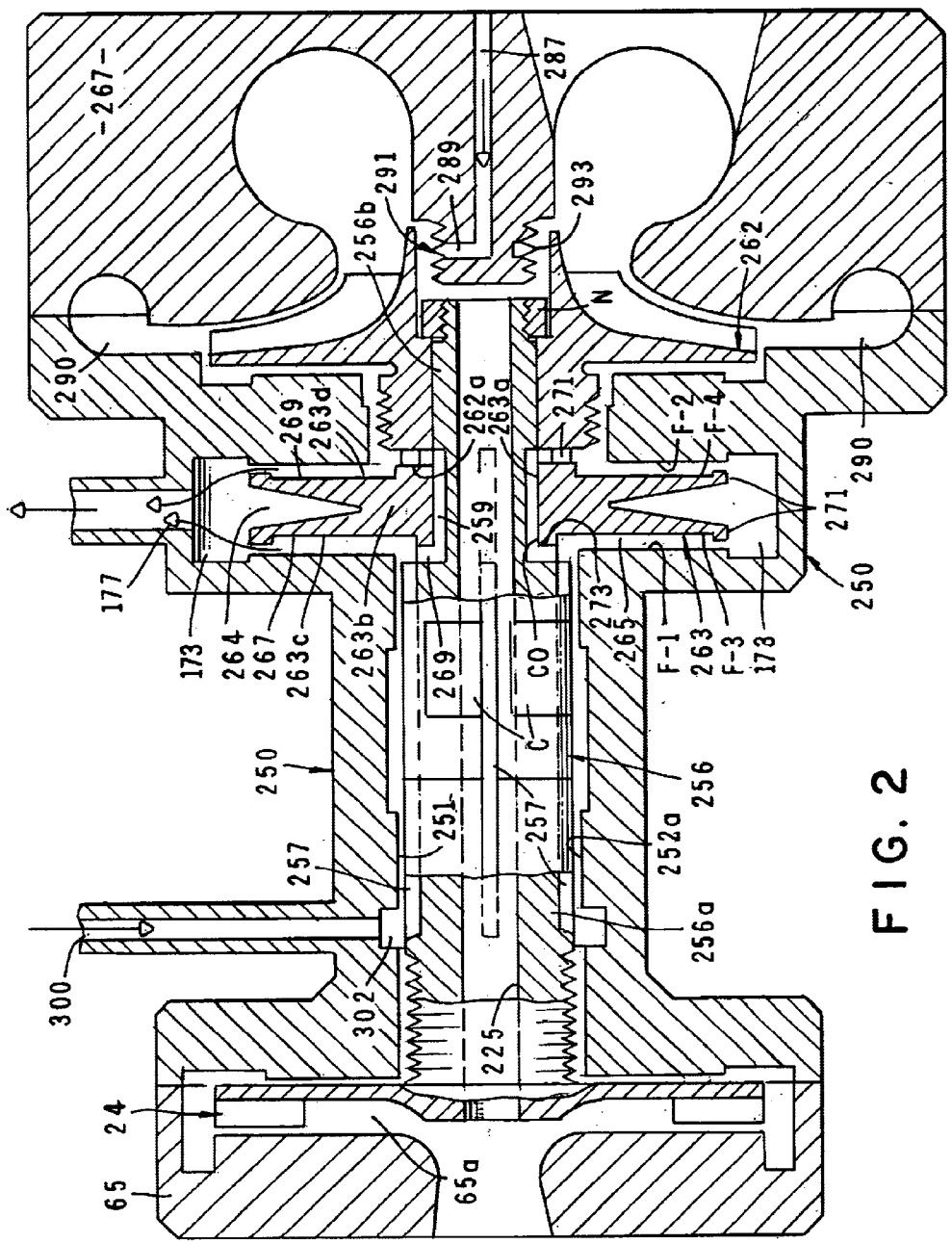
FIG. 2 is a diagrammatic, side elevation, cross-sectional view of one form of the gas bearing turbocompressor apparatus of the present invention showing the novel thrust washer of the invention installed there within.

Referring particularly to FIG. 2 the improved turbo compressor of the present invention can be seen to comprise a support 250 that is disposed within a fluid atmosphere and includes longitudinally spaced first, second, faces F-1 and F-2. Support 250 also has a longitudinally extending bore 252a that is generally circular in cross section at any point and defines an inner surface 251. Each of the third and fourth faces of support 250 have a recess provided therein which is concentric with bore 252a and is in fluid communication therewith.

An elongated, generally cylindrical shaft 256, which is rotatable within bore 242a of support 250 has a first portion 256a and a second, reduced diameter portion 256b. Reduced diameter portion 256b is provided with a plurality of flow passages 259 that communicate with grooves 257 provided in shaft 256 that feed gas to recessed areas C of shaft 256 (see also FIGS. 4, 5, and 6). Shaft 256, which is of a predetermined diameter less than the diameter of bore 252a, also has a longitudinally extending central bore 225 there through.

A first closure member 65, which is identical to closure member 65 of the '302 patent, defines a first chamber 65a. A first wheel 24, which is also identical to wheel 24 of the '302 patent, is disposed within first chamber 65a and is connected to shaft 256 for rotation therewith.

A second closure member 267 is also connected to support 250 to define a second chamber 290. A second wheel 262 is disposed within second chamber 290 and, in a manner presently to be described, is connected to reduced diameter portion 256b of said shaft 256 for rotation therewith. A third wheel or disk 263, functioning a thrust washer, has a central opening "CO" that is received over reduced diameter portion 256b of said shaft.

It should be noted that the opening in third wheel 162 (FIG. 1) and the opening 263a in disk 263 (FIG. 2) are needed for the physical assembly of the respective turbocompressors even though the openings play no part in the principles of operation of the thrust bearing.

As previously mentioned, the central opening as well as the openings 179 in wheel 162 weaken the disk against stresses generated by centrifugal forces when the disk is spinning at high speed. Such stresses increase with the diameter of the disk as well as the square of the angular speed, and may exceed the strength of the material resulting in the destruction of the disk if either diameter or angular speed exceed a limiting value. Since the angular speed is predetermined by gas dynamic requirements of the turbine and compressor wheels, the diameter is limited by the strength of the material. However, the diameter is desired to be as large as possible, because the aerodynamic stiffness of the thrust bearing is proportional to the square of the diameter. In light of the foregoing, a primary objective of the present invention is the reduction of the centrifugal stresses in the disk so as to allow an increase in the diameter of the disk and consequently an increase in the aerodynamic stiffness of the bearing. A further objective of the invention is to accomplish the reduction of centrifugal stresses while at the same time retaining the flatness and parallelism of the faces of the disk so as to maintain the gas dynamic performance of the thrust bearings. Still another important objective of the present invention is to reduce the stresses in the disk by removing the stress concentrations resulting from openings, such as the openings 179 that are found in wheel 162 of the '302 patent.

It is well known that the stress in a spinning wheel or disk is largest at the edges of a central hole, and that this stress can be substantially decreased by tapering the axial thickness of the disk from a maximum near the center to a minimum at the edge. This can be uniquely reconciled with the requirement that the faces of the disk be flat and parallel by machining a deep, profiled groove 263a (FIG. 3) from the edge of the disk 263 toward the center, whereby the facing surfaces of the groove generate the required change of axial thickness of the remaining material between the groove and either flat face. The thickness of the remaining material can be computed to provide essentially constant stress in accordance with mathematical methods well known in the art.

It is also well known that holes in a plate under stress double the tangential stress at the edge of the hole and thereby act as stress concentrators. Since the design of the high temperature thrust bearing requires communication of gas from one face to the other, apertures, such as apertures 179 in the third wheel 162 of the prior art turbocompressor shown in FIG. 1, comprise such stress concentrators. This undesirable stress can be reduced by transferring the flow openings from the disk to the shaft. This is precisely what has been done in the embodiment of the present invention as shown in FIGS. 2 through 8. More specifically, in this improved turbocompressor, openings, such as the openings 179, in the third wheel of '302 patent have been eliminated in favor of the previously identified grooves or flow passages 259 (FIG. 2) that take the form of a continuation of grooves 257 which are provided exist in shaft 256 for the purpose of feeding gas to recesses C.

With the forgoing in mind, thrust washer 263 is constructed in the unique configuration best seen in FIGS. 2 and 3 and has spaced-apart faces F-3 and F-4. As there illustrated, disk 263 is generally circular shaped, has a diameter "D" (FIG. 3) and comprises a body portion 263b. Body portion 263b has spaced-apart, generally parallel faces 263c and 263d. Inward facing faces 267a and 267b define the generally "V" shaped groove 264 that is formed intermediate the generally parallel spaced-apart faces. These spaced-apart faces, in turn, define the radially outwardly extending segments 267 and 269, each of which has a stepped portion 272 (FIG. 3). Groove 263a has a depth typically greater than one-half of the radius of the disk having a diameter "D" and has sloping sidewalls 267a and 267b profiled to provide essentially constant stress in body 263b. More specifically, the sloping sidewalls of groove 263a define first and second faces each being disposed in a plane extending at an acute angle relative to the planes of spaced apart faces 263c and 263d of third wheel 263.

As best seen in FIG. 2, when the improved turbo compressor is fully assembled wheel 263 is received over shaft portion 256b and is securely clamped between a shoulder 273 formed at the junction of shaft portions 256a and 256b and a shoulder 262a formed on member 262. Member 262 is maintained in the position shown in FIG. 2 by a threaded retaining nut "N". In this configuration, on one side of disk 263, flow passageways 257 formed in shaft portion 256a communicate with radial flow passageways 269 (see also FIGS. 5 and 6), which, in turn, communicate with chamber 265. On the other side of disk 263, flow passageways 257 communicate with chamber 265 via radial flow passageways 271. Turning to FIG. 4A, it is to be noted that flow passageways 259 do not have to be aligned with passageways 271.

In operating the improved turbocompressor shown in FIGS. 2 through 7, seal gas is admitted through a single gas inlet 300. The gas then flows through a circumferential groove 302 in the housing 250 and is delivered via longitudinal grooves 257 to flow passageways 269. The gas then flows into chamber 265 on one side of wall 263c and finally out to a volume 173 in the direction of the arrow 177. In the manner indicated by the arrows 279 of FIG. 3, the second thrust bearing that is located on the other side of wheel 263 receives seal gas through flow passageways 259 and 271 which form a direct channel of communication with the portions of chamber 265 that are located on either side of disk 263 (see also FIG. 4).

With the novel constructions described in the preceding paragraph, the apparatus can function in the same manner as described in the '302 patent without having to provide openings in the thrust washer such as openings 179.

For more discussion of the construction and theory of operation of the thrust bearings of this latest form of the invention, reference should be made to incorporate by reference U.S. Pat. No. 6,231,302.

As is also shown in FIG. 2, a third gas supply means or third gas inlet 287, which functions in the same manner as the third gas supply means of the '302 patent, is provided in or near the axis of support member 267. This third gas inlet is interconnected with a circumferential groove 289 located in the middle of labyrinth 291, and is provided with teeth 293 on either side.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made with out departing from the scope and spirit of the invention, as set forth in the following claims.

I claim:

1. A turbocompressor comprising:
   (a) a housing;
   (b) a shaft rotatably mounted within said housing;
   (c) gas supply means operably associated with said housing for rotating said shaft;
   (d) a generally circular shaped wheel connected to said shaft for rotation therewith, said wheel having a diameter and comprising a body portion having spaced apart faces and a groove formed intermediate said spaced apart faces to define a pair of radially outwardly extending solid segments, said groove having a depth generally greater than one-half said radius.

2. The turbocompressor as defined in claim 1 in which said groove has sloping sidewalls.

3. The turbocompressor as defined in claim 1 in which said groove is generally "V" shaped.

4. The turbocompressor as defined in claim 1 in which said spaced apart faces of said body portion are generally parallel.

5. A turbocompressor comprising:
   (a) a support having a longitudinally extending bore,
   (b) an elongated generally cylindrical shaft rotatable within said bore of said support, said shaft having first and second ends and an intermediate portion disposed between said first and second ends;
   (c) gas supply means operably associated with said housing for rotating said shaft;
   (d) a first closure member connected to said support;
   (e) a generally circular shaped disk connected to said shaft for rotation therewith, said disk having a central portion and a periphery and comprising a body portion having spaced apart, generally parallel faces and a groove formed intermediate said spaced apart faces to define a pair of radially outwardly extending segments each of said segments uniformly tapering from a maximum proximate said central portion to a minimum proximate said periphery.

6. The turbocompressor as defined in claim 5 in which said groove is generally "V" shaped.

7. The turbocompressor as defined in claim 6 in which said groove has a depth greater than one half said diameter.

8. The turbocompressor as defined in claim 7 in which said segments are stepped.

9. A turbocompressor comprising:
   (a) a support having a longitudinally extending bore, generally circular in cross section at any point, said bore defining an inner surface, said support being disposed within a fluid atmosphere and including longitudinally spaced first, and second faces defining an intermediate chamber there between;
   (b) an elongated generally cylindrical shaft rotatable within said bore of said support, said shaft having first and second ends and an intermediate portion disposed between said first and second ends, said shaft including a longitudinally extending bore and having an outer surface provided with a plurality of circumferentially spaced, longitudinally extending grooves and a plurality of recessed areas of predetermined depth;
   (c) a first closure member connected to said support to define in cooperation therewith, a first chamber;
   (d) a first wheel disposed within said first chamber and connected to said first end of said shaft for rotation therewith, said first wheel being subjected to a first axial force;
   (e) a second closure member connected to said support to define, in cooperation therewith a second chamber;
   (f) a second wheel disposed within said second chamber and connected to said second end of said shaft for rotation therewith, said second wheel being subjected to a second axial force;
   (g) a generally circular shaped disk disposed within said intermediate chamber, said disk having a radius and comprising a body portion having a central portion and a periphery and spaced apart faces and a groove formed intermediate said spaced apart faces to define a pair of radially outwardly extending solid segments, each of said segments tapering from a maximum proximate said center portion to a minimum proximate said periphery; and
   (h) equalizing means for substantially equalizing said first and second axial forces upon rotation of said shaft within said bore in said support, whereby said shaft will remain substantially axially centered within said bore in said support, said equalizing means comprising first and second fluid operated thrust bearings provided between said faces of said disk wheel and said faces of said support respectively.

10. The turbocompressor defined in claim 9 further including supply means for supplying a seal gas to said longitudinally extending bore of said support.

11. The turbocompressor as defined in claim 9 in which said spaced apart faces of said disk are generally parallel.

12. The turbocompressor as defined in claim 9 in which said groove in said disk includes first and second faces each being disposed in a plane extending at an acute angle relative to said spaced apart faces of said third wheel.

13. The turbocompressor as defined in claim 12 in which said groove has a depth generally greater than one-half said radius.

14. The turbocompressor as defined in claim 12 in which said groove is shaped to a predetermined profile controlling stress in said disk.

15. The turbocompressor as defined in claim 12 in which said segments are stepped.

16. A turbocompressor comprising:
   (a) a support having a longitudinally extending bore,
   (b) an elongated generally cylindrical shaft rotatable within said bore of said support, said shaft having first and second ends and an intermediate portion disposed between said first and second ends, said intermediate portion having a plurality of flow passageways formed therein;
   (c) gas supply means operably associated with said housing for rotating said shaft;
   (d) a first closure member connected to said support;
   (e) a generally circular shaped disk connected to said intermediate portion of said shaft for rotation therewith, said disk having a radius and comprising a body portion having spaced apart, generally parallel faces and a groove formed intermediate said spaced apart faces to define a pair of radially outwardly extending stepped segments, said groove having a depth generally greater than one-half said radius.

17. A turbocompressor comprising:
   (a) a housing;
   (b) a shaft rotatably mounted within said housing;
   (c) gas supply means operably associated with said housing for rotating said shaft; and
   (d) a generally circular shaped disk connected to said shaft for rotation therewith, said disk having a radius and comprising a body portion having a center, a periphery, and an intermediate portion and spaced apart faces, said disk having an axial thickness tapering from a maximum proximate said intermediate portion to a minimum proximate said periphery, whereby stresses at said center of said disk are reduced.

18. The turbocompressor as defined in claim 17 in which said body portion has a groove having a depth generally greater than one-half said radius.

* * * * *